(12) United States Patent
Lo et al.

(10) Patent No.: US 12,724,259 B2
(45) Date of Patent: Sep. 1, 2026

(54) LIGHT-FIELD SCANNER FOR LIGHT-FIELD DISPLAY

(71) Applicant: PetaRay Inc., New Taipei (TW)

(72) Inventors: I-Chan Lo, Taipei (TW); Jiun-Woei Huang, Taipei (TW); Hong-Ming Chen, Taipei (TW)

(73) Assignee: PetaRay Inc., New Taipei (TW)

( * ) Notice: Subject to any disclaimer, the term of this patent is extended or adjusted under 35 U.S.C. 154(b) by 344 days.

(21) Appl. No.: 18/519,045

(22) Filed: Nov. 26, 2023

(65) Prior Publication Data

US 2025/0172799 A1 May 29, 2025

(51) Int. Cl.
*G02B 26/10* (2006.01)
*G02B 13/16* (2006.01)
*G02B 27/30* (2006.01)

(52) U.S. Cl.
CPC ............ *G02B 26/10* (2013.01); *G02B 13/16* (2013.01); *G02B 27/30* (2013.01)

(58) Field of Classification Search
CPC .. G02B 26/10; G02B 26/105; G02B 26/0875; G02B 26/101; G02B 26/0833; G02B 26/085; G02B 26/08; G02B 26/125; G02B 30/10; G02B 30/27; G02B 27/0075; G02B 27/017; G02B 27/0172; G02B 27/0093; G02B 27/0025; G02B 27/1026; G02B 27/0031; G02B 27/30; G02B 13/16; G02B 5/09; G02F 1/11; G02F 1/33; G02F 1/29; G02F 1/294; H04N 9/3129; H04N 9/3182; H04N 9/3185; H04N 9/312; H04N 13/344; H04N 13/332; H04N 13/307
USPC ......... 359/201, 204, 201.1, 202.1, 234, 298, 359/462, 630–633; 345/6, 419; 348/46, 348/51
See application file for complete search history.

(56) References Cited

U.S. PATENT DOCUMENTS 8,754,829 B2 * 6/2014 Lapstun ................ G06T 19/006 348/51
2016/0355024 A1 * 12/2016 Bai ...................... H04N 9/3129
2017/0235140 A1 * 8/2017 Kusanagi ................ H04N 5/30 345/7
2022/0236584 A1 7/2022 Huang

* cited by examiner

*Primary Examiner* — Jie Lei
(74) *Attorney, Agent, or Firm* — Demian K. Jackson; Jackson IPG PLLC

(57) ABSTRACT

The present invention provides a light-field scanner for light-field display that integrates a light-field buffer, a laser-beam scanner, and a collimator, all within the scanner to produce telecentric light. The present invention may further comprise a compander for beam adjustment to ensure compatibility with various light-field generators.

10 Claims, 7 Drawing Sheets

LIGHT-FIELD SCANNER FOR LIGHT-FIELD DISPLAY

TECHNICAL FIELD OF THE INVENTION

The present invention relates to light-field display; more particularly, to a light-field scanner which loads data from a light-field buffer to output laser beam for scanning sub-light-field images with telecentric light through a collimator for resolving vergence-accommodation conflict (VAC).

DESCRIPTION OF THE RELATED ARTS

The realm of near-eye display technologies has significant advancements with the introduction of light field displays, which produce light field to create realistic visual experiences. Existing technology, as disclosed in US20220236584A1, presents a display device known as a light-field generator, which produces light field for near-eye viewing and resolves the vergence-accommodation conflict inherent in conventional displays.

The success of light-field display relies on the compatibility between the light-field generator and its input light source. The light-field generator is designed to work with panel-based light source. Yet, laser beam has not been introduced as an input for such light-field display.

SUMMARY OF THE INVENTION

The main purpose of the present invention is to provide a light-field scanner that generates sub-light-field images by the scanning of laser beam, where the laser beam is collimated into telecentric light with density to be further adjusted for resolving VAC issue.

To achieve the above purpose, the present invention is a light-field scanner for light-field display, comprising a light-field buffer, a laser-beam scanner, and a collimator, where the light-field buffer stores light-field data comprising an array of sub-light-field images; the laser-beam scanner outputs laser beam to scan all the sub-light-field images of the light-field data; and the collimator is connected to the light-field scanner to collimate laser beam into telecentric light. Accordingly, a novel light-field scanner for light-field display is obtained.

BRIEF DESCRIPTION OF THE DRAWINGS

The present invention can be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Please refer to FIG. 1 to FIG. 7, which are a side view showing a whole system for light-field display; a view showing the composition and scanning sequence of sub-light-field images; a view showing laser beam projected by the light-field scanner; a side view showing a virtual scanning plane formed by a collimator; a side view showing a light-field scanner forming the virtual scanning plane; a side view showing a compander reducing the extent of the virtual scanning plane; and a side view showing the compander enlarging the extent of the virtual scanning plane. As shown in the figures, the present invention is a light-field scanner for light-field display, where the light-field scanner is an integral component for light-field display for enhancing the visual experience of real-world scenes and resolving vergence-accommodation conflict (VAC).

Figure 1:
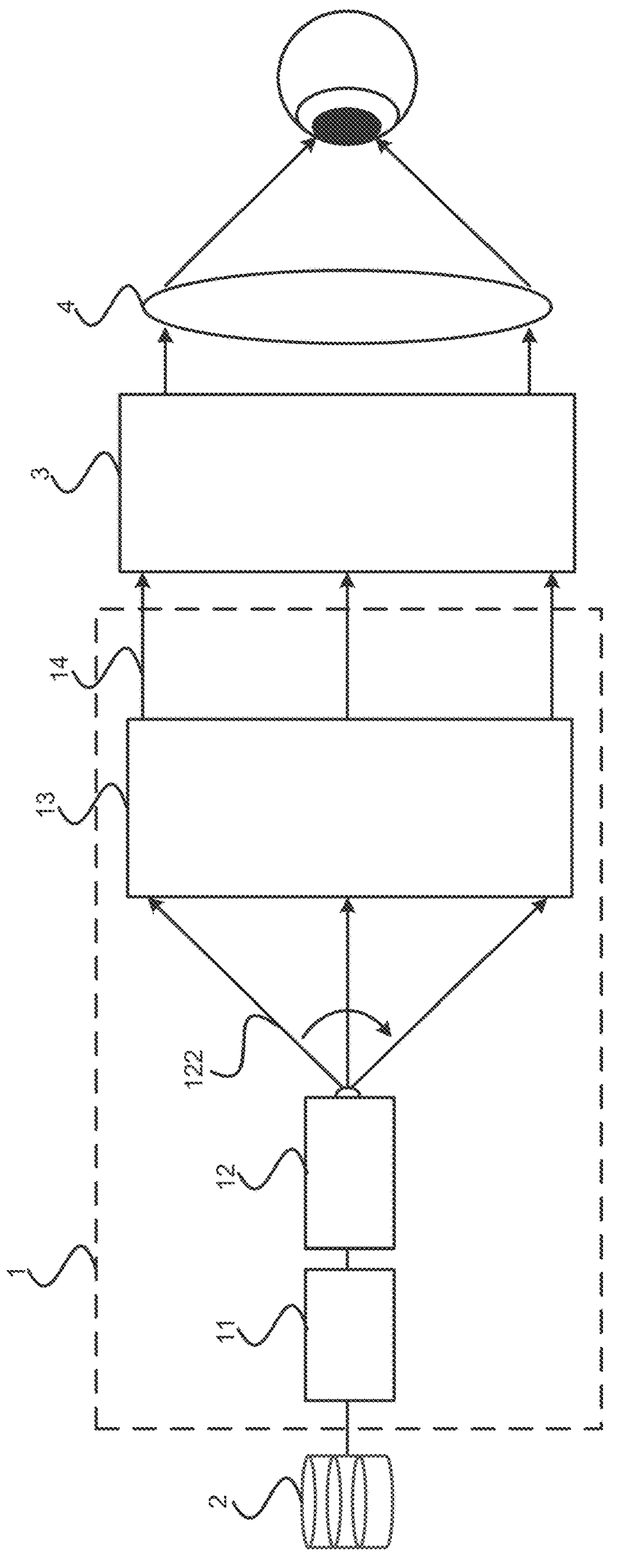
FIG. 1 is the side view showing the whole system for light-field display.

In FIG. 1, a whole system is provided for light-field display. The light-field display starts with a light-field data 2 inputted into the light-field scanner 1. The light-field scanner 1 processes the light-field data 2 and outputs telecentric light 14 into a light-field generator 3 for forming light field at an eyepiece 4 for viewing. The light-field scanner 1 comprises a light-field buffer 11, storing the light-field data comprising an array of sub-light-field images; a laser-beam scanner 12, outputting laser beam 122 to scan the sub-light-field images of the light-field data 2; and a collimator 13, connected to the laser-beam scanner 12 to collimate laser beam 122 into telecentric light 14. The light-field data 2 are four-dimensional, meaning that a pixel of the light field data 2 is represented by two angular coordinates and two spatial coordinates in the simplest form.

Figure 2:
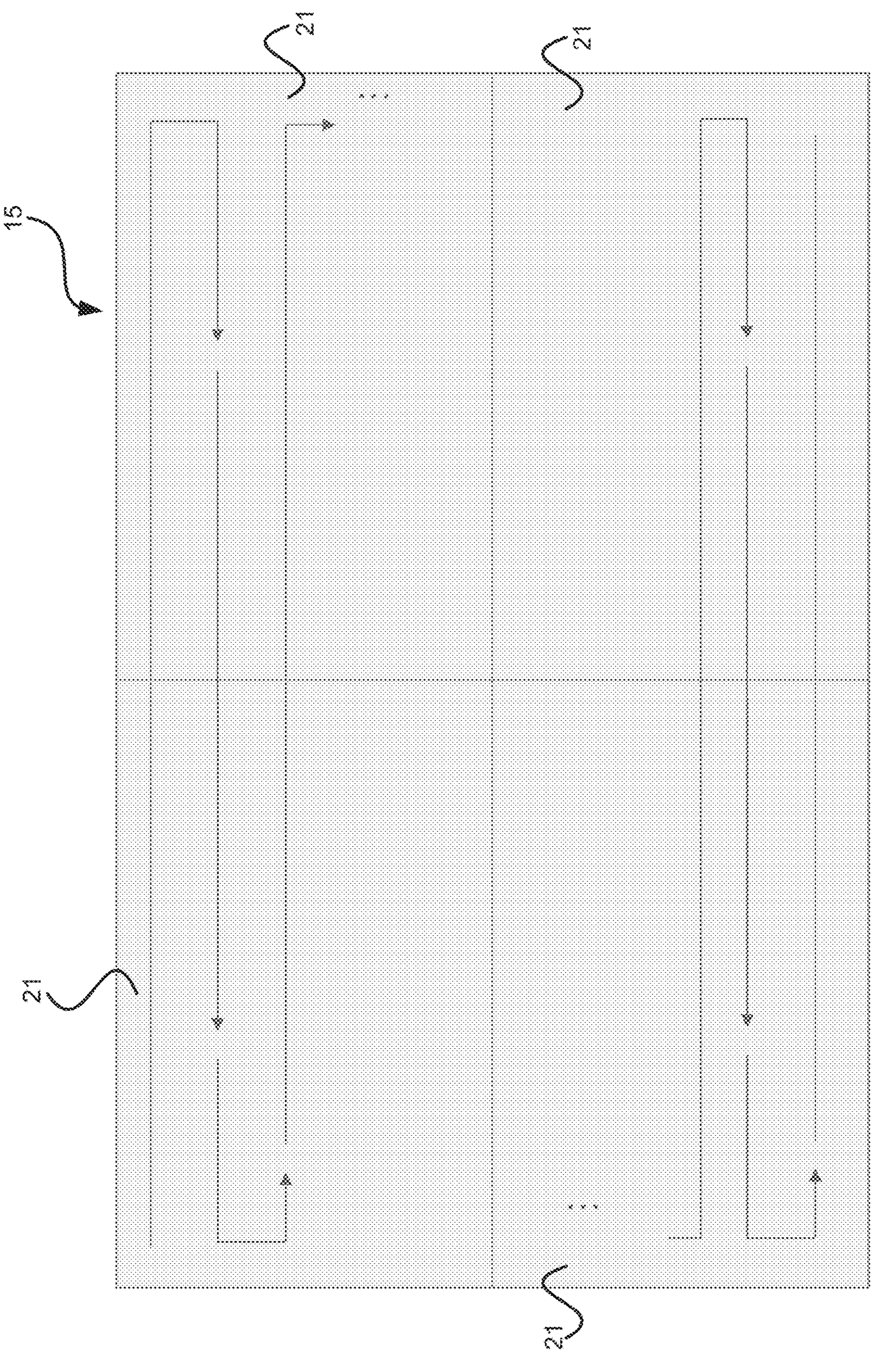
FIG. 2 is the view showing the composition and scanning sequence of sub-light-field images.

In FIG. 2, a scanning cycle of all pixels stored in the light-field data 2 is detailed with the composition and scanning sequence of sub-light-field images 21 on a virtual scanning plane 15. Within the light-field scanner 1, the light-field buffer 11 stores the compressed light-field data 2 for efficient storage. Subsequently, during decompression, the light-field buffer 11 converts the light-field data 2 into the sub-light-field images 21. Each of the sub-light-field images 21 is a two-dimensional subset of the light-field data 2 and contains pixels having the same angular coordinates but different spatial coordinates.

Figure 3:
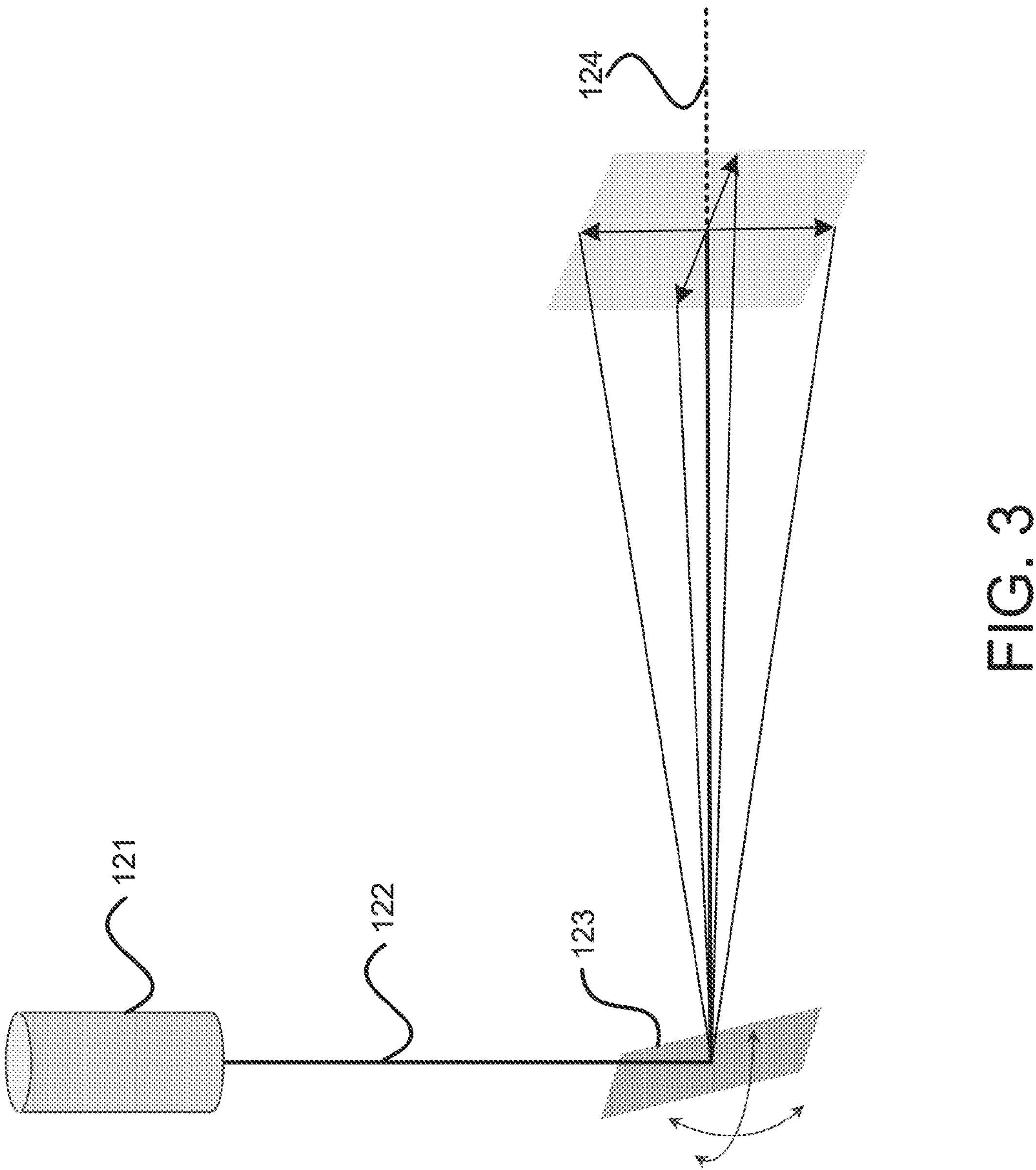
FIG. 3 is the view showing the laser beam projected by the light-field scanner.
Figure 4:
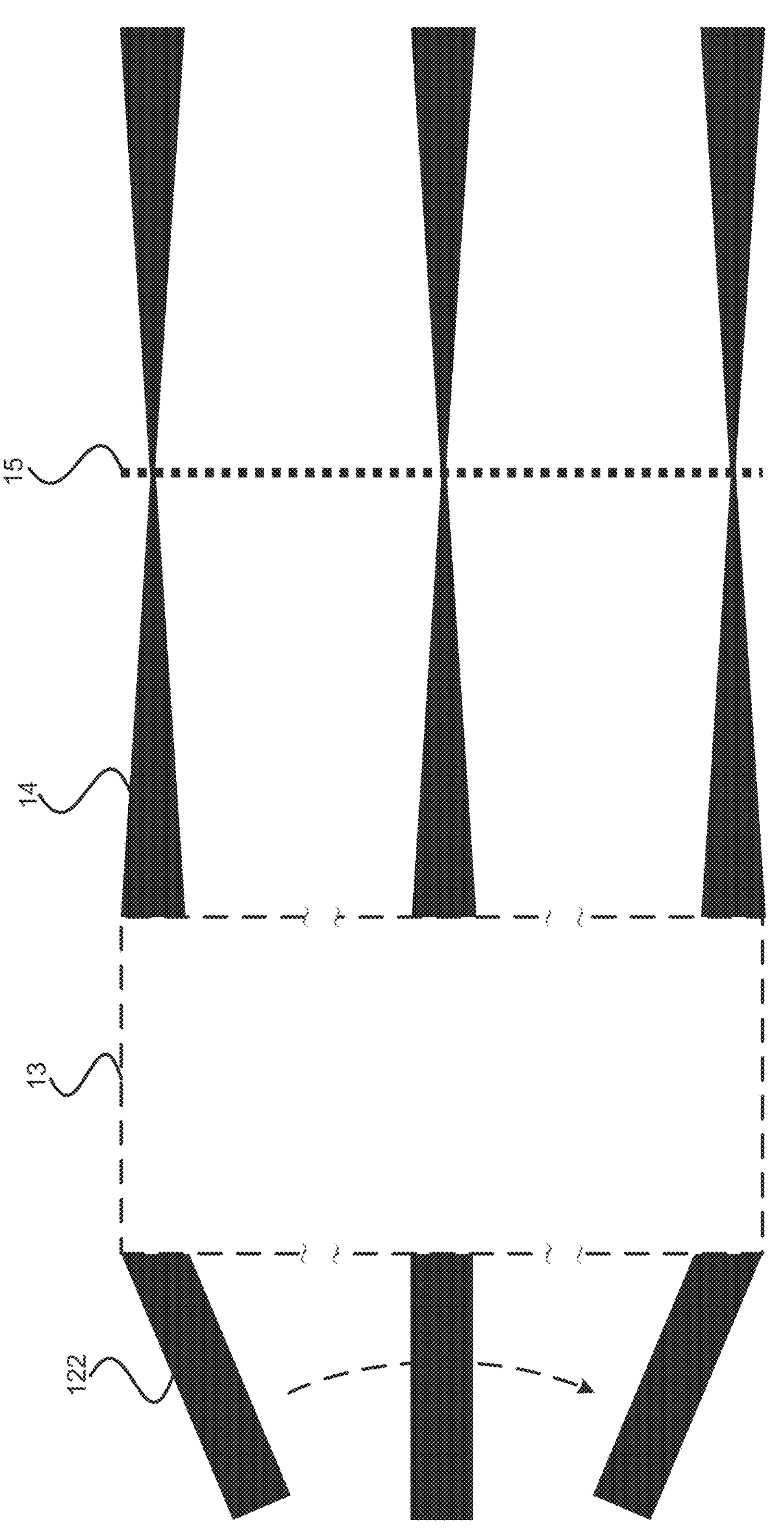
FIG. 4 is the side view showing the virtual scanning plane formed by the collimator.

In FIG. 3, the laser-beam scanner 12, comprising a laser diode 121 and a digitally-controlled scanning mirror 123, projects laser beam 122, where a scanning cycle is accomplished through a cycling movement of the digitally-controlled scanning mirror 123. The laser-beam scanner 12 emits laser beam according to the value of each pixel of the sub-light-field images 21. The laser beam 122 is the result of the emission of a laser at a singular time instance; i.e. the laser-beam scanner 12 emits only one laser beam at any given moment. The emission is directed by a digitally-controlled scanning mirror 123 which cycles back and forth along horizontal and vertical directions. In FIG. 4, the virtual scanning plane 15 is formed with the sub-light-field images 21 by converting laser beam 122 into telecentric light 14 entirely through the collimator 3 over the course of the scanning cycle.

Figure 5:
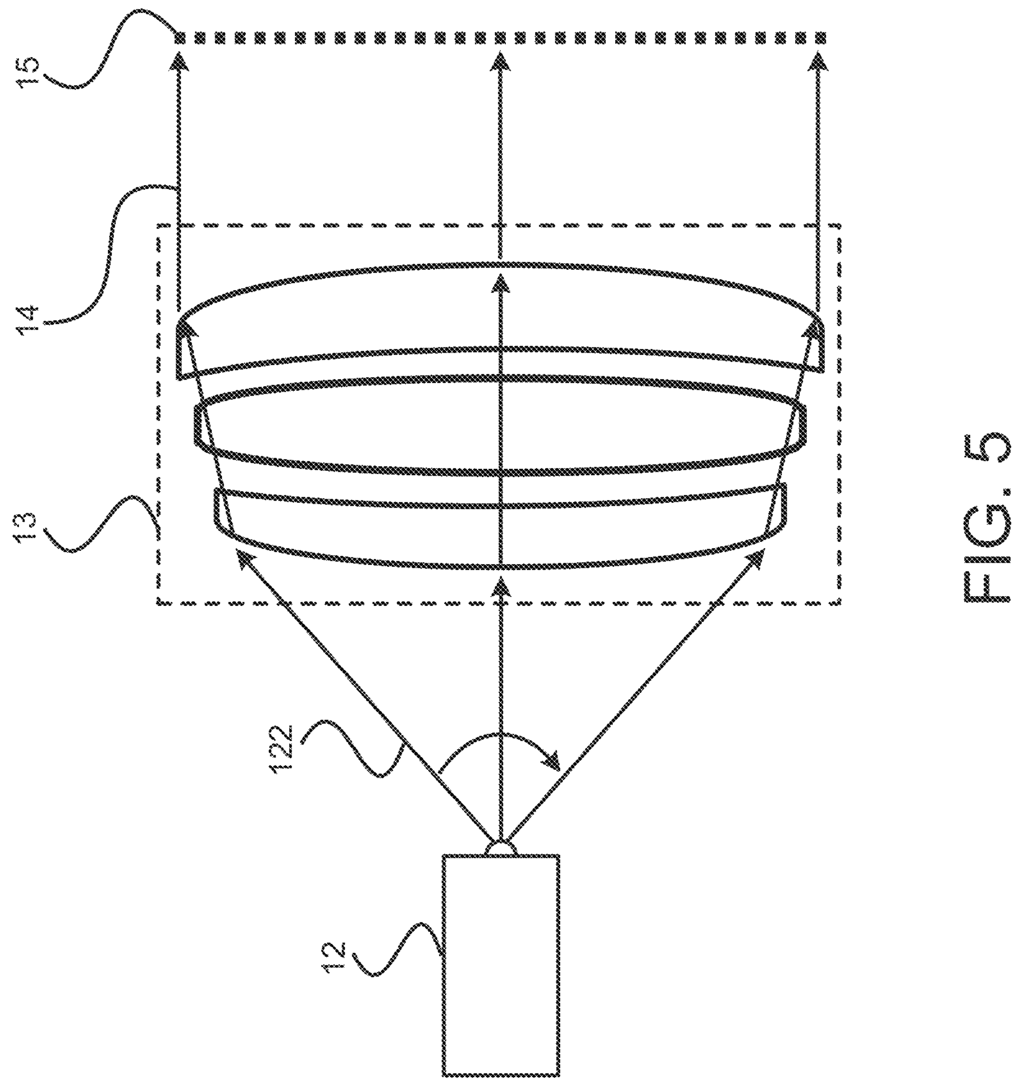
FIG. 5 is the side view showing the light-field scanner forming the virtual scanning plane.

In FIG. 5, the light-field scanner 1 forming the virtual scanning plane 15 is provided. The collimator 13, connected to the laser-beam scanner 12, converts laser beam 122 into telecentric light 14. The telecentric light 14 has a principal ray parallel to an optical axis 124. This is essential for forming the virtual scanning plane 15, where the laser beam 122 is focused to have a minimum thickness. The etendue of laser beam 122 is controlled by adjusting the position of the collimator 13. The etendue refers to the extent of spread of laser beam and determines the size of an eyebox (not shown in the figures). The eyebox is the spatial region where light field remains observable to user.

Figure 6:
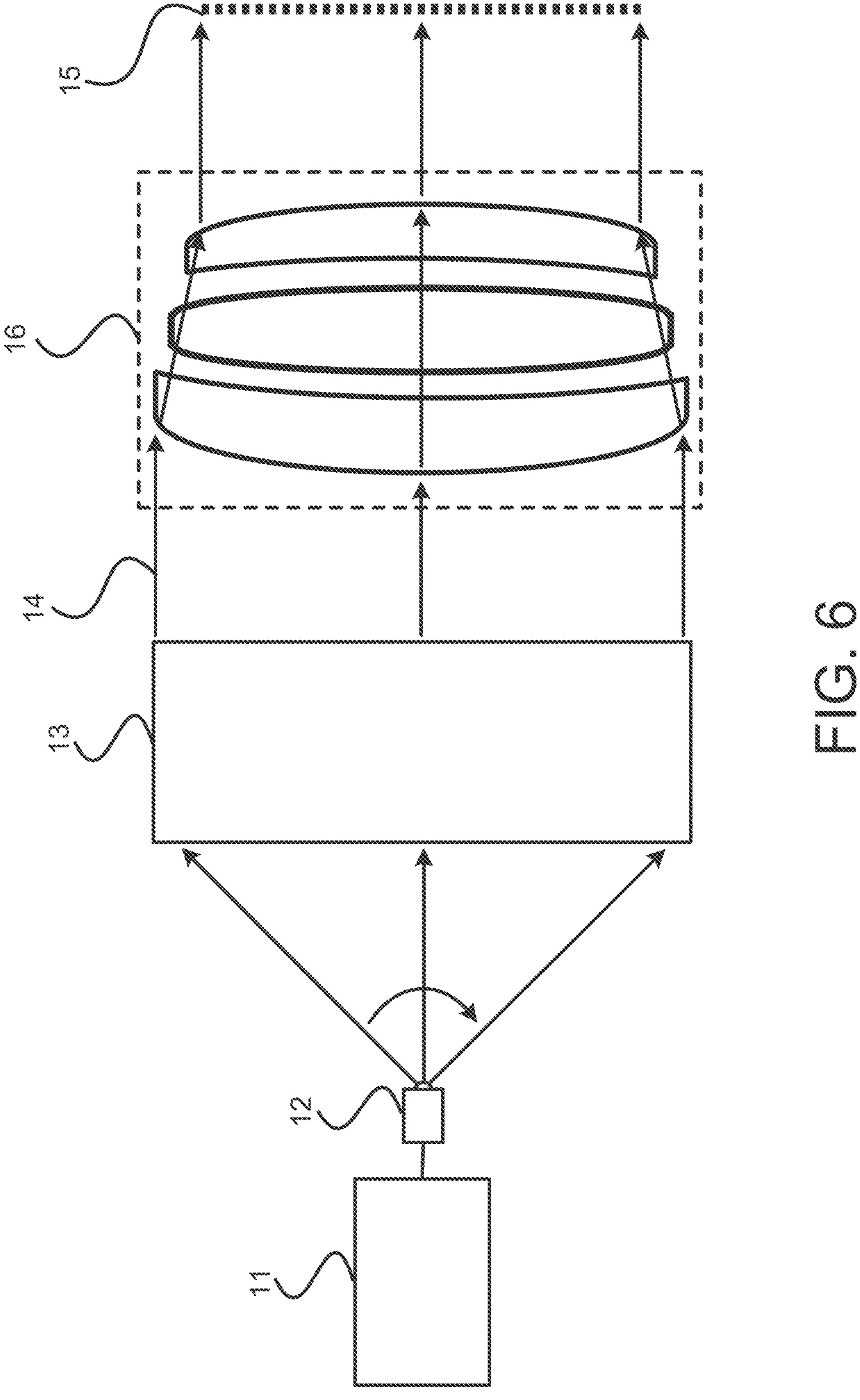
FIG. 6 is the side view showing the compander reducing the extent of the virtual scanning plane.
Figure 7:
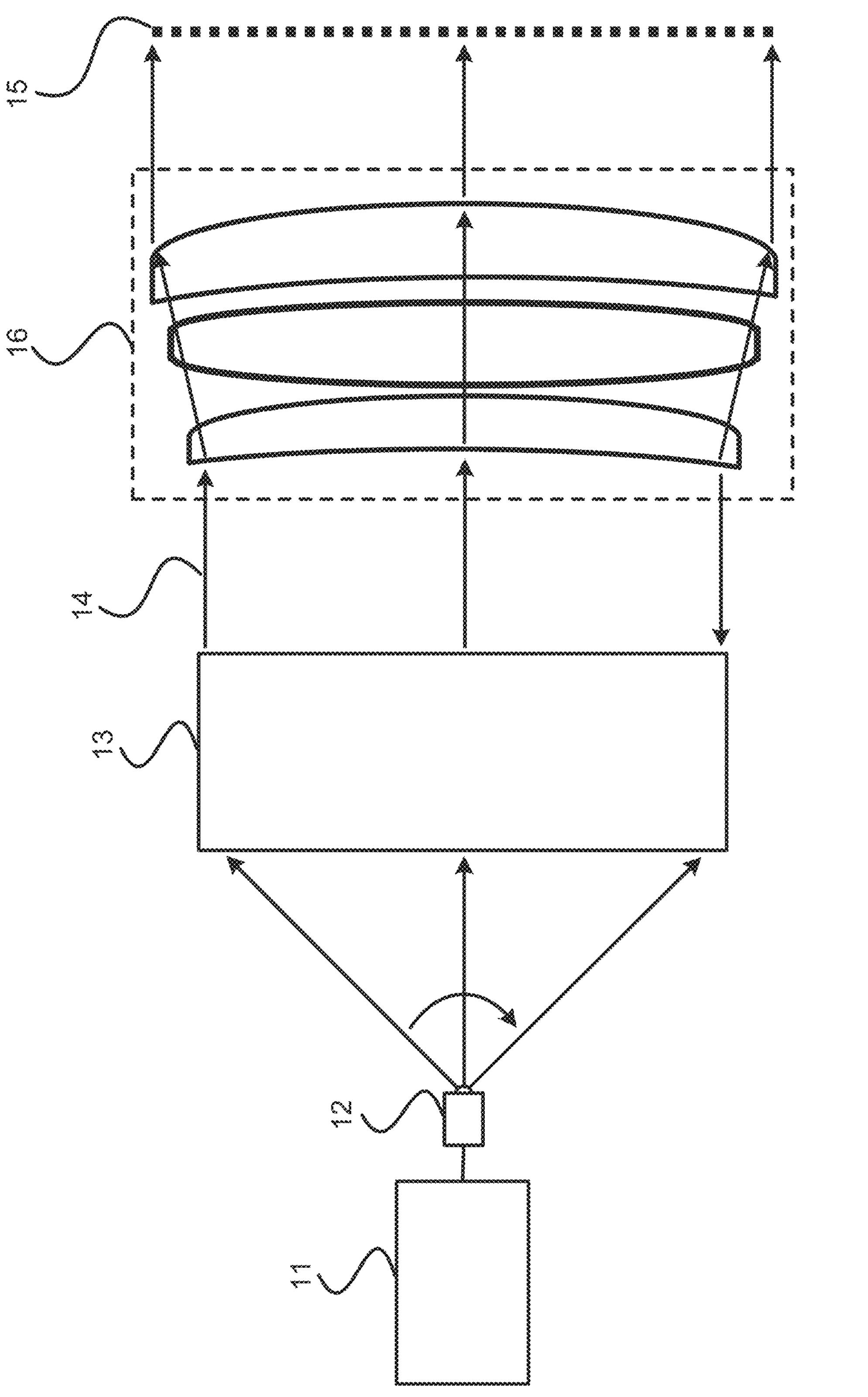
FIG. 7 is the side view showing the compander enlarging the extent of the virtual scanning plane.

The present invention may also comprise a compander 16 connected to the collimator 13 to adjust the size of the virtual scanning plane 15 at which laser beam 122 is collimated into telecentric light 14 and obtains smallest thickness. In FIG. 6 and FIG. 7, the compander 16 is positioned after the collimator 13 to reduce or enlarge the extent of the virtual scanning plane 15 to adapt the light-field scanner to different sizes of light field generators.

To sum up, the present invention is a light-field scanner for light-field display, where a light-field buffer, a laser-beam scanner, and a collimator are all integrated within a scanner to produce telecentric light for resolving VAC issue; and a compander is featured for beam adjustment to ensure compatibility with various light-field generators.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A light-field scanner for light-field display comprising a light-field buffer storing light-field data comprising an array of sub-light-field images;

a laser-beam scanner outputting a laser beam to scan all said sub-light-field images of said light-field data;

a collimator connected to said laser-beam scanner and collimating the laser beam into telecentric light forming a virtual scanning plane; and a light-field generator receiving the telecentric light.

2. The light-field scanner according to claim 1, further comprising a compander connected to said collimator to adjust the size of the virtual scanning plane.

3. The light-field scanner according to claim 2, wherein said compander forms a light field required by the light-field generator.

4. The light-field scanner according to claim 1, wherein an etendue of said laser beam is controlled by adjusting the position of said collimator.

5. The light-field scanner according to claim 4, further comprising an eyebox which has a size determined by said etendue.

6. The light-field scanner according to claim 1, wherein each of said sub-light-field images is a two-dimensional subset of said light-field data.

7. The light-field scanner according to claim 6, wherein each two-dimensional subset of said light-field data contains pixels having the same angular coordinates, but different spatial coordinates.

8. The light-field scanner according to claim 1, wherein said light-field data in said light-field buffer are compressed, and are further decompressed before being accessed by said laser-beam scanner.

9. The light-field scanner according to claim 1, wherein said laser-beam scanner comprises a laser diode and a digital-control scanning mirror.

10. The light-field scanner according to claim 9, wherein said laser diode emits laser beam through said digital-control scanning mirror back and forth along horizontal and vertical directions.

* * * * *